US012754448B2

(12) United States Patent
Reiter et al.

(10) Patent No.: US 12,754,448 B2
(45) Date of Patent: Oct. 6, 2026

(54) SYSTEMS AND DEVICES FOR DISPLAY SURFACE TEMPERATURE REDUCTION

(71) Applicant: Wayne Fueling Systems LLC, Austin, TX (US)

(72) Inventors: Jeffrey Thomas Reiter, Austin, TX (US); Daniel Jeremy Holmes, Round Rock, TX (US); Randal Scott Kretzler, Austin, TX (US); Mackenzie Graham Thatcher, Round Rock, TX (US); Thad John Harbour, McKinney, TX (US)

(73) Assignee: Wayne Fueling Systems LLC, Austin, TX (US)

( * ) Notice: Subject to any disclaimer, the term of this patent is extended or adjusted under 35 U.S.C. 154(b) by 227 days.

(21) Appl. No.: 18/480,618

(22) Filed: Oct. 4, 2023

(65) Prior Publication Data

US 2024/0118567 A1 Apr. 11, 2024

Related U.S. Application Data

(60) Provisional application No. 63/378,461, filed on Oct. 5, 2022.

(51) Int. Cl.
*G02F 1/1333* (2006.01)
*B67D 7/04* (2010.01)
*B67D 7/22* (2010.01)

(52) U.S. Cl.
CPC ......... *G02F 1/133382* (2013.01); *B67D 7/04* (2013.01); *B67D 7/221* (2013.01)

(58) Field of Classification Search
CPC ................. B67D 7/04; G02F 1/133382; G02F 1/133388
See application file for complete search history.

(56) References Cited

U.S. PATENT DOCUMENTS 5,867,403 A 2/1999 Sasnett, Jr. et al.
8,755,021 B2* 6/2014 Hubbard ........... G02F 1/133382 349/58

(Continued)

FOREIGN PATENT DOCUMENTS

JP H08184827 A 7/1996
JP 2011150034 A 8/2011

OTHER PUBLICATIONS

International Search Report and Written Opinion for Application No. PCT/US2023/075921, mailed on Mar. 22, 2024, 20 pages.

(Continued)

*Primary Examiner* — Jennifer C Chiang
(74) *Attorney, Agent, or Firm* — Mintz, Levin, Cohn, Ferris, Glovsky and Popeo, P.C.

(57) ABSTRACT

Various devices and systems for display surface temperature reduction are provided. For example, such a device can comprise a vented display having a display assembly configured to generate and project images, a backlight assembly configured to generate light to illuminate the display assembly, and an air gap that separates the display assembly from the backlight assembly and that is configured to permit a flow of air through the air gap to thereby facilitate the transfer of heat from the display assembly to the air flowing through the air gap to cool the display. For example, such a system can comprise a convective cooling system that is configured to direct a flow of cooling air across an exterior surface of a display and thereby lower the temperature of the exterior surface.

19 Claims, 15 Drawing Sheets

(56) References Cited

U.S. PATENT DOCUMENTS

| | | | |
|---|---|---|---|
| 2002/0154255 | A1 | 10/2002 | Gromatzky et al. |
| 2016/0242330 | A1 * | 8/2016 | Dunn ................ G02F 1/133308 |

OTHER PUBLICATIONS

Invitation to Pay Additional Fees received for Application No. PCT/US2023/075921, mailed on Jan. 19, 2024, 12 pages.

* cited by examiner

SYSTEMS AND DEVICES FOR DISPLAY SURFACE TEMPERATURE REDUCTION

CROSS REFERENCE TO RELATED APPLICATION

This application claims the benefit of and priority to U.S. Provisional Patent Application No. 63/378,461 filed on Oct. 5, 2022, entitled "SYSTEMS AND DEVICES FOR DISPLAY SURFACE TEMPERATURE REDUCTION," the entire contents of which are hereby expressly incorporated by reference.

FIELD

Systems and devices for display surface temperature reduction are provided.

BACKGROUND

Product dispensers, such as fuel dispensers, can often include displays that are configured to present information to product dispenser users. Additionally, some product dispensers are equipped with touchscreen displays that are configured to receive touch inputs from product dispenser users. These touchscreen displays thereby allow product dispenser users to operate so-equipped product dispensers via their touch interactions with the display. And, some of these displays feature a "bonded" construction in which glass or plastic cover lenses, various filters, and, in the case of a touchscreen, a touchscreen sensor assembly, are laminated as a unit to an LCD/backlight assembly.

While "bonded" displays can feature excellent optical performance, it can be very difficult to prevent "bonded" displays from overheating, particularly in outdoor installations in which they are exposed to sunlight. When the temperature of such a display exceeds the maximum-permitted design temperature, defects such as spotting, which can distort the displayed content, may begin to appear. Additionally, once the outwardly-facing surface of the display overheats, it may become too hot for a user to safely touch without the user experiencing discomfort or even burning their hand in doing so.

Some approaches for cooling displays can include providing ventilation openings in the housing in which the display is installed to thereby allow for display heat dissipation through the ventilation openings. However, a product dispenser housing is often exposed to the outdoor environment. As such, the installation of ventilation openings in a product dispenser housing would result in the intrusion of water, fuel vapors, and other contaminants, which can cause components of the display and other components installed in the product dispenser housing to fail.

Accordingly, there remains a need for systems and devices for display temperature reduction.

SUMMARY

Various systems and devices for display surface temperature reduction are provided. Related methods and techniques are also described.

In one aspect a display is provided. In an embodiment, the display can include a display assembly including a liquid crystal display configured to generate and project an image and a transparent cover coupled to the liquid crystal display and configured to permit viewing of the projected image. The display can also include a backlight assembly including a backlight source configured to generate light for illuminating the liquid crystal display and a backlight cover layer configured to diffuse the light emitted by the backlight source. The display can also include an air gap separating the display assembly from the backlight assembly. The air gap can be configured to permit a flow of air therethrough and thereby facilitate the transfer of heat from the display assembly to the air.

In some embodiments, the transparent cover can include a glass material or a plastic material. In some embodiments, the display assembly can include an infrared film layer bonded to the liquid crystal display opposite the transparent cover. In some embodiments, the display assembly can include a touch sense layer coupled to the transparent cover. In some embodiments, the backlight cover layer can include a transparent cover glass. In some embodiments, the air gap can be defined by a distance between the display assembly and the backlight assembly, the distance being between 1 mm and 15 mm.

In another aspect, a product dispenser is provided. In an embodiment, the product dispenser can include a housing having one or more components installed therein and configured to dispense fuel. The product dispenser can also include a display incorporated into the housing. The product dispenser can also include a cooling system incorporated into the housing. The cooling system can include a fan housing having at least one air inlet formed on a first exterior surface thereof. The cooling system can also include a fan disposed within the fan housing and in fluid communication with the air inlet, and an air outlet formed on a second exterior surface of the fan housing and in fluid communication with the fan. The air outlet can be disposed adjacent to an exterior-facing surface of the display. The fan can be configured to draw air through the air inlet and to direct the air out of the air outlet such that the air flows across the exterior-facing surface of the display.

In some embodiments, operation of the fan can be controlled based on data received from at least one of a temperature sensor, a timer, an infrared temperature sensor, or a camera. In some embodiments, the air inlet and the air outlet can be fluidically connected to an inner cavity within the housing, and the fan can be configured to circulate air within the inner cavity. In some embodiments, the cooling system can be integrated into an upper portion of the housing at a location above the display and in between opposing towers of the housing. In some embodiments, the cooling system can include an intake cover adjacent to the fan housing and the air inlet is positioned at a lateral side of the intake cover. In some embodiments, the first exterior surface of the fan housing and the second exterior surface of the fan housing can be perpendicular to one another. In some embodiments, the air intake can include overlapping rows of apertures extending along the first exterior surface of the fan housing. In some embodiments, the fan can be disposed opposite the overlapping rows of apertures. In some embodiments, the fan can be a cylindrical shaped fan having a longitudinal axis extending along a length of the fan and a plurality of fan blades arranged radially about the longitudinal axis. In some embodiments, the air outlet can be configured superior to the exterior-facing surface of the display such that the air flows out of the air outlet in a downward direction over the exterior-facing surface of the display configured below the air outlet.

In another aspect, a touchscreen display is provided. In an embodiment, the touchscreen display can include a display module configured to generate and project an image. The touchscreen display can also include a transparent cover configured to permit viewing of the projected image. The display module can be positioned adjacent a first surface of the transparent cover. The touchscreen display can further include a thermally-insulating film layer formed on a second surface of the transparent cover. The second surface can be opposite the first surface.

In some embodiments, the thermally-insulating film layer can include a single layer of thermally-insulating material or a plurality of layers of thermally-insulating material. In some embodiments, the plurality of layers can include a multi-layer polyester sheet with an acrylic adhesive. In some embodiments, the touchscreen display can be included in at least one of a product dispenser, an automated teller machine, an electrical charging kiosk, a vending machine, or a payment kiosk.

BRIEF DESCRIPTION OF DRAWINGS

The embodiments described above will be more fully understood from the following detailed description taken in conjunction with the accompanying drawings. The drawings are not intended to be drawn to scale. For purposes of clarity, not every component may be labeled in every drawing. In the drawings.

DETAILED DESCRIPTION

Certain exemplary embodiments will now be described to provide an overall understanding of the principles of the structure, function, manufacture, and use of the systems, devices and methods disclosed herein. One or more examples of these embodiments are illustrated in the accompanying drawings.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Sizes and shapes of the systems and devices, and the components thereof, can depend at least on the dimensions of the subject in which the systems and devices will be used, the size and shape of components with which the systems and devices will be used, and the methods with which the systems and devices will be used.

Various devices and systems for display surface temperature reduction are provided. For example, such a device can comprise a vented display having a display assembly configured to generate and project images, a backlight assembly configured to generate light to illuminate the display assembly, and an air gap that separates the display assembly from the backlight assembly and that is configured to permit a flow of air through the air gap to thereby facilitate the transfer of heat from the display assembly to the air flowing through the air gap to cool the display. For example, such a system can comprise a convective cooling system that is configured to direct a flow of cooling air across an exterior surface of a display and thereby lower the temperature of the exterior surface. For example, such a device can comprise a display having a thermally-insulating film layer formed on an exterior surface of the display and configured to reduce the transfer of heat from the display to a finger of a user in contact with the display.

Figure 1A:
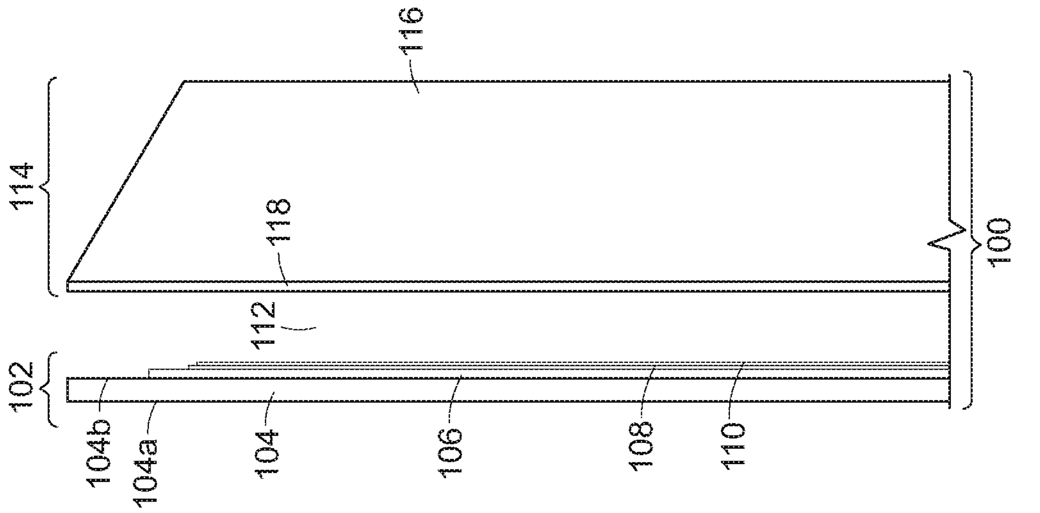
FIG. 1A is a side view of one embodiment of a vented display.
Figure 1B:
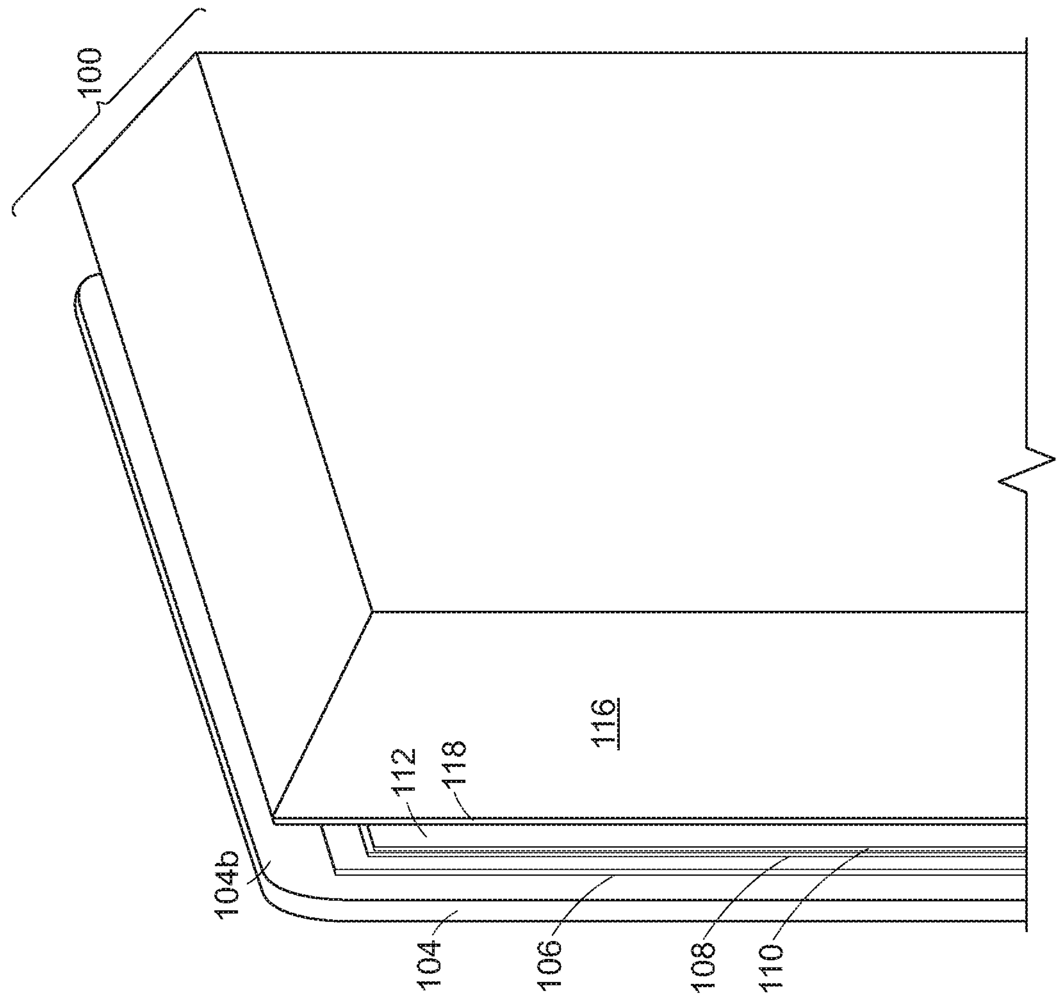
FIG. 1B is a perspective view of the vented display of FIG. 1A.

FIGS. 1A and 1B illustrate one exemplary embodiment of a vented display 100 that is configured to dissipate heat from a touch surface and/or liquid crystal display (LCD) incorporated into the vented display 100. As shown, the vented display 100 includes a display assembly 102 that includes one or more components that are used to display information to the product dispenser user. The display assembly 102 can have a wide variety of sizes and shapes. For example, the display assembly 102 can have a diagonal dimension ranging from approximately 6 inches to 80 inches. However, these dimensions are by no means limiting as the display assembly 102 can have a diagonal dimension that is outside of this approximate range as appropriate for the installation of the display assembly 102. The display assembly 102 includes a transparent cover 104 that is configured to shield one or more components of the vented display 100 from the external environment. The cover 104 includes an outwardly-facing surface 104*a* that faces the external environment. When the vented display is configured as a touchscreen display, the outwardly-facing surface 104*a* also serves as the surface that a product dispenser user can touch when interacting with the touchscreen display to control one or more aspects of the operation of the product dispenser. The transparent cover 104 also includes an inwardly-facing surface 104*b* that is opposite the outwardly-facing surface 104*a* and faces the other, internal components of the vented display 100 that are inwardly disposed relative to the transparent cover 104. As shown in this embodiment, the transparent cover 104 is formed from transparent glass. However, in some embodiments, other transparent covering materials (e.g., clear plastic, etc.) may be used instead of glass.

As shown, the display assembly 102 also includes a touch sensor layer 106 that is configured to sense a product dispenser user's touch of the outwardly-facing surface 104*a* of the transparent cover 104. In some implementations, the touch sensor layer 106 may be bonded to or otherwise coupled to the inwardly-facing surface 104*b* of the transparent cover. Additionally, in some embodiments in which a touchscreen is not installed, the touch sensor layer 106 may be omitted from the vented display 100 altogether.

The display assembly 102 also includes a liquid crystal display (LCD) 108 that is configured to generate and project images through the touch sensor layer 106 and the transparent cover 104 for viewing by the product dispenser user. As shown, the LCD 108 includes an outwardly-facing surface that can be bonded to or otherwise coupled to the touch sensor layer 106, such that the LCD 108 is disposed inward of the touch sensor layer 106. And, as shown, the display assembly 102 also includes an infrared film layer 110 that is bonded to or otherwise coupled to an inwardly-facing surface of the LCD 108 and disposed inward of the LCD 108. The infrared film layer can be configured to reduce the transfer of heat to the LCD 108 and thereby reduce the likelihood of the LCD 108 overheating. Additionally, in some implementations, the infrared film layer 110 may be omitted from the vented display 100.

As shown in FIGS. 1A and 1B, the vented display 100 also includes an air gap 112 that is disposed inward of the display assembly 102 and forms an of free space within the vented display 100 that is configured to permit the flow of air past an inward-facing side of the display assembly 102. The flow of air through the air gap 112 can cause the convective transfer of heat from the display assembly 102 and to the air flowing through the air gap 112. Thereby, the air gap 112 can aid in the dissipation of excess heat that has accumulated in the display assembly 102 and lower the temperature of the display assembly 102 to reduce the likelihood of an overheating failure of one or more components of the display assembly 102. In addition, when the vented display is configured as a touchscreen, the dissipation of heat in the display assembly 102 caused by the air flowing through the air gap 112 can reduce the likelihood of a product dispenser user burning themselves when touching the transparent cover 104 during an interaction with the product dispenser.

As shown, the vented display 100 also includes a backlight assembly 114 that is configured to illuminate the display assembly 102 and thereby enhance the viewing of the display assembly 102 by a product dispenser user. As shown, the backlight assembly 114 is positioned inward of the air gap 112, such that the air gap 112 is bounded by the display assembly 102 on an outward side of the air gap 112 and by the backlight assembly 114 on an inward side of the air gap 112. Thus, the volume of the air gap 112 can be determined in part by the distance between the inward-facing surface of the air gap 112 and the outward-facing surface of the backlight assembly 112. For example, in some embodiments, the distance between these surfaces can range from approximately 1 mm to 15 mm. In some embodiments, the distance between these surfaces can be determined by an amount of airflow needed to achieve a desired temperature of the display assembly 102. In some embodiments, the distance between these surfaces can vary based on a variety of factors, such as the type of device in which the vented display 100 is to be installed, quality of display optics, and/or brightness needed for the display. Given that the air gap 112 is placed between the backlight assembly 114 and the display assembly 102, the air flowing through the air gap 112 can effectively cool the components of the display assembly 102 without needing to also cool the backlight assembly 114 as well. As such, the vented display 100 requires less energy to cool the display assembly components, such as the LCD 108 and the cover 104, than would otherwise be required if the air gap 112 was not included in the vented assembly 100.

The backlight assembly 114 includes a backlight source 116 that is configured to generate light and thereby illuminate the display assembly 102. The backlight assembly 114 also includes a backlight cover layer 118 that is bonded to or otherwise coupled to on an outwardly-facing surface of the backlight source 116. In some embodiments, the backlight cover layer 118 may include a diffuser layer that is configured to diffuse the light emitted by the backlight source 116 and thereby improve the uniformity of the light generated by the backlight source 116. In some embodiments, the backlight cover layer 118 may include a transparent cover glass that is configured to transmit the light generated by the backlight source 116 and thereby illuminate the display assembly 102.

Figure 1C:
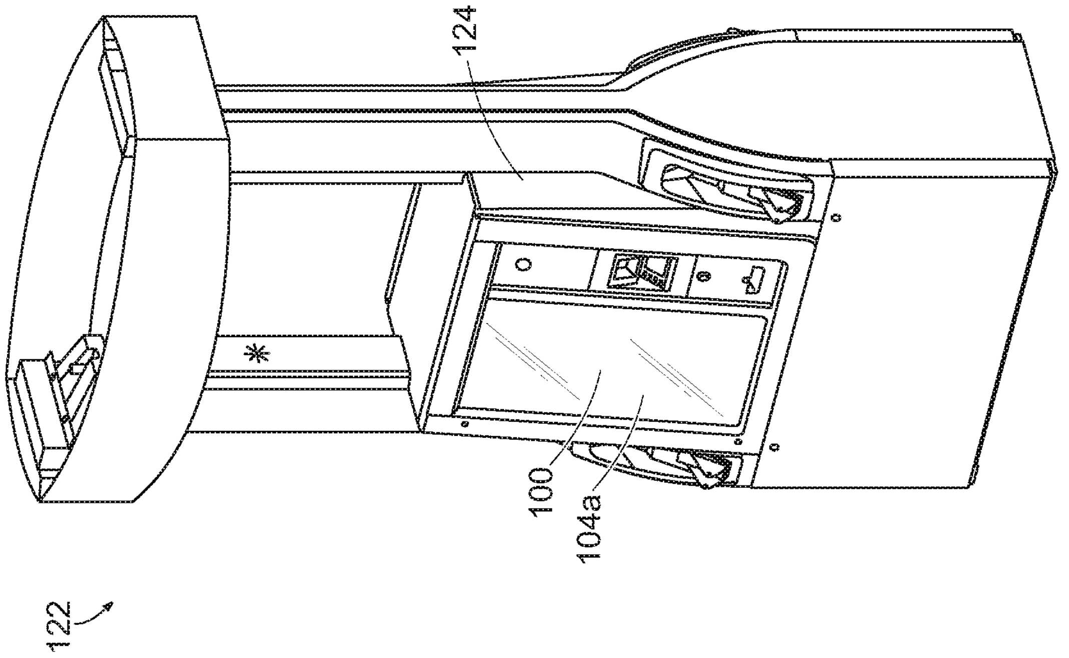
FIG. 1C is a perspective view of an exemplary product dispenser in which the vented display of FIG. 1A has been installed.

FIG. 1C illustrates an exemplary product dispenser 122 that includes the vented display 100 described above, and FIG. 1D illustrates a section view of the vented display 100 when installed in the product dispenser 122. In some implementations, the product dispenser 122 can be a fuel dispenser to dispense petroleum fuel. In some implementations, a product dispenser (e.g., the product dispenser 122 of FIG. 1C, etc.) configured to include a vented display feature can be configured to dispense type(s) of "fuel" besides a petroleum fuel. For example, the product dispenser can be configured to dispense hydrogen, liquid propane gas (LPG) or compressed natural gas (CNG), water, electricity, or the like. It will be understood that the fueling stations and the product dispensers described herein are not limited to petroleum gasoline in liquid format and that other types of product dispensers configured to dispense alternate types of "fuel" can be envisioned. For example, in some implementations, the product dispenser can be a hydrogen fuel dispenser. For another example, in some implementations, the product dispenser can be a natural gas fuel dispenser. For yet another example, in some implementations, the product dispenser can be an electric charging station.

Figure 1D:
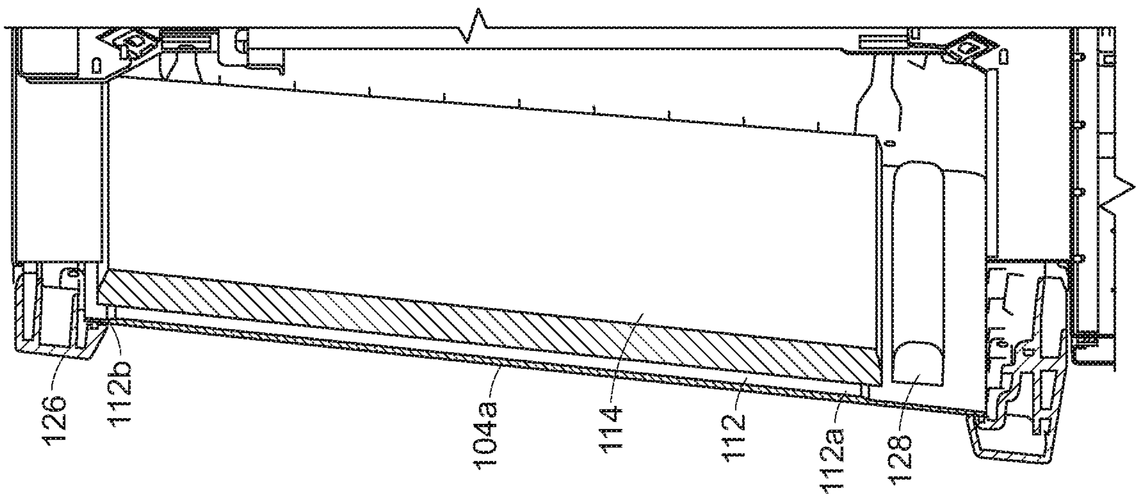
FIG. 1D is a section view of the exemplary product dispenser of FIG. 1C that illustrates the vented display of FIG. 1A.

As shown in FIG. 1C, the vented display 100 is installed in a housing 124 of the product dispenser such that the outwardly-facing surface 104*a* of the transparent cover 104 faces a user interacting with the product dispenser 122. When installed in the product dispenser housing 124, as shown in FIG. 1D, the vented display 100 is mounted to a frame 126 of the product dispenser housing 122.

Figure 1E:
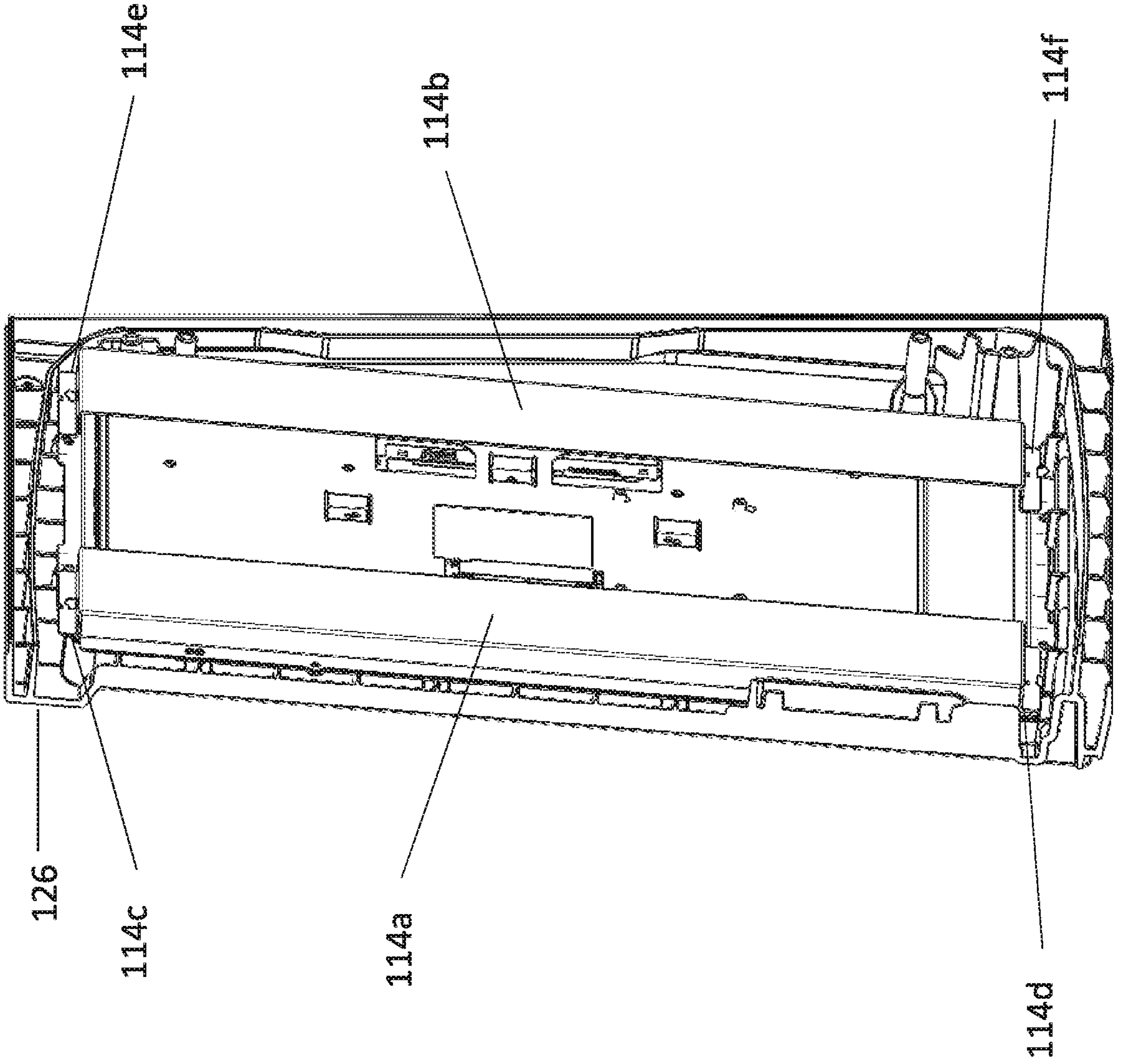
FIG. 1E is a perspective section view that illustrates a rear portion of the vented display of FIG. 1A when installed in the exemplary product dispenser of FIG. 1C.

In some embodiments, the backlight assembly 114 is coupled to the display assembly 102. And, in some embodiments, the backlight assembly 114 is not coupled to the display assembly 102. FIG. 1E illustrates the vented display 100 installed within the product dispenser 122 in an exemplary configuration in which the backlight assembly 114 is not coupled to the display assembly 102. As shown, when installed in this configuration, the backlight assembly 114 is held in place next to the display assembly 102 (not shown in this view) by two backlight assembly mounting supports 114*a*, 114*b* that are configured to retain the backlight assembly in position. As shown in FIG. 1E, the backlight assembly mounting support 114*a* is attached to the frame 126 of the product dispenser housing 122 via two mounting brackets

114*c* and 114*d*, and the backlight assembly mounting support 114*b* is attached to the frame 126 of the product dispenser housing 122 via two mounting brackets 114*e* and 114*f*.

When mounted on the frame 126, the vented display 100 is positioned such that a lower opening 112*a* of the air gap 112 is disposed adjacent to a forced convection device 128 (e.g., a fan, etc.) that is configured to drive the flow of air into the lower opening 112*a* of the air gap 112, vertically upward through the air gap 112, and through an upper opening 112*b* of the air gap 112 to thereby remove heat from the display assembly 102. Additionally, in some embodiments, the forced convection device 128 is not present, and air instead moves into the lower opening 112*a*, vertically upward through the air gap 112, and through the upper opening 112*b* via natural convection.

In some embodiments, the forced convection device 128 may employ one or more of a variety of techniques for reducing the temperature of the air driven into the lower opening 112*a*. For example, in some embodiments, the forced convection device 128 may employ vortex cooling of the air with a vortex cooler, active piezo cooling, water cooling, peltier cooling, refrigeration, and/or a heat exchanger system to reduce the temperature of the air. In some embodiments, the operation of the forced convection device 128 may be controlled based on data received or generated by one or more devices in operable communication with the forced convection device 128, such as temperature sensors, solar loading sensors, a timer, an infrared temperature sensor, a camera, and the like. As such, the forced convection device 128 may be activated in response to one of these devices sensing or determining a condition in which a temperature of the display assembly 102 has or is likely to have exceeded a temperature threshold. For example, in some embodiments, the forced convection device 128 may be activated in response to a temperature sensor measuring the temperature of the display assembly 102 and determining that the measured temperature has exceeded a temperature threshold and therefore the transparent cover 104 of the display assembly 102 may be unsafe to touch.

In some embodiments, the forced convection device 128 and/or the lower opening 112*a* may be in fluid communication with intake duct(s) that permit outside air to be drawn in and supplied to the air gap 112. Similarly, in some embodiments, the upper opening 112*b* may be in fluid communication with exhaust duct(s) that permit air driven through the air gap 112 to be vented to areas outside of the product dispenser housing in which the vented display 100 is installed. In some embodiments, the lower opening 112*a* and/or the upper opening 112*b* may be in fluid communication with an interior cavity of the product dispenser housing 122 such that the air flowing through the air gap 112 is drawn from the air in the interior cavity and returned to the interior cavity.

Figure 2A:
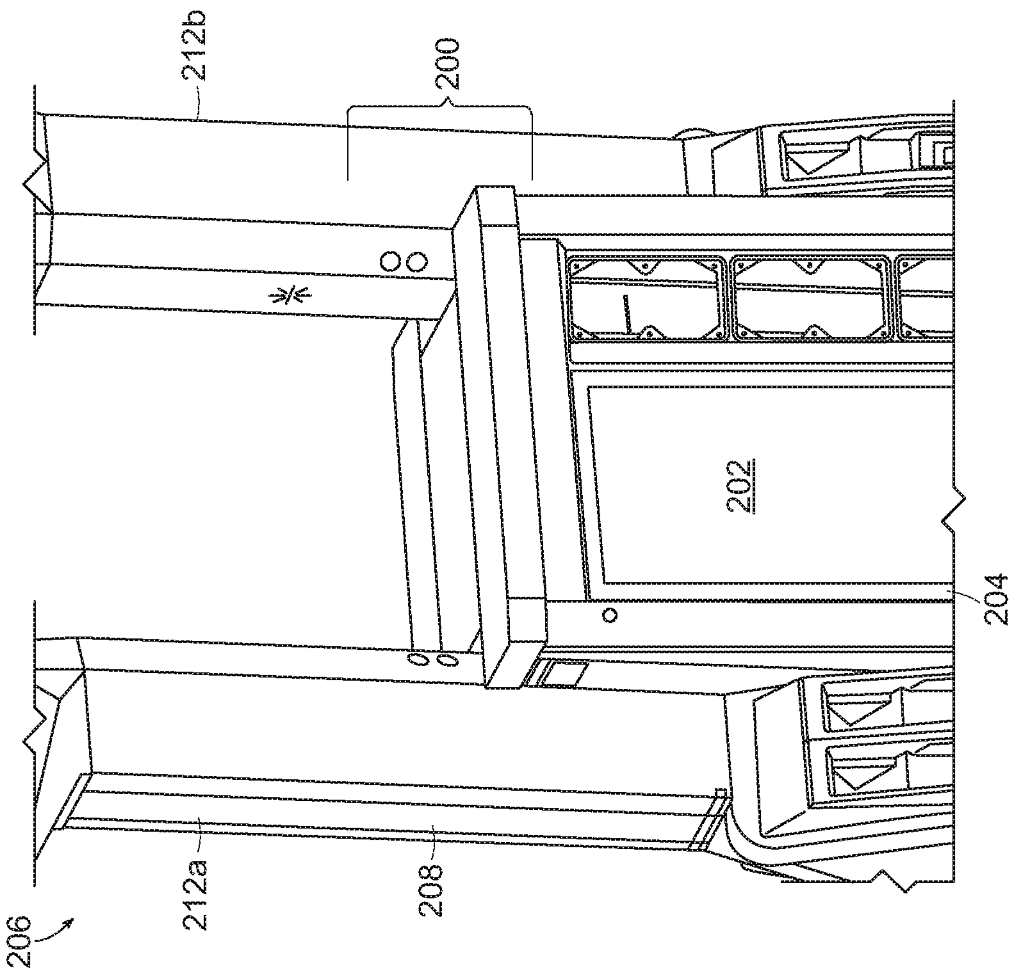
FIG. 2A is a perspective view of a product dispenser featuring an outer display surface convective cooling system.
Figure 2B:
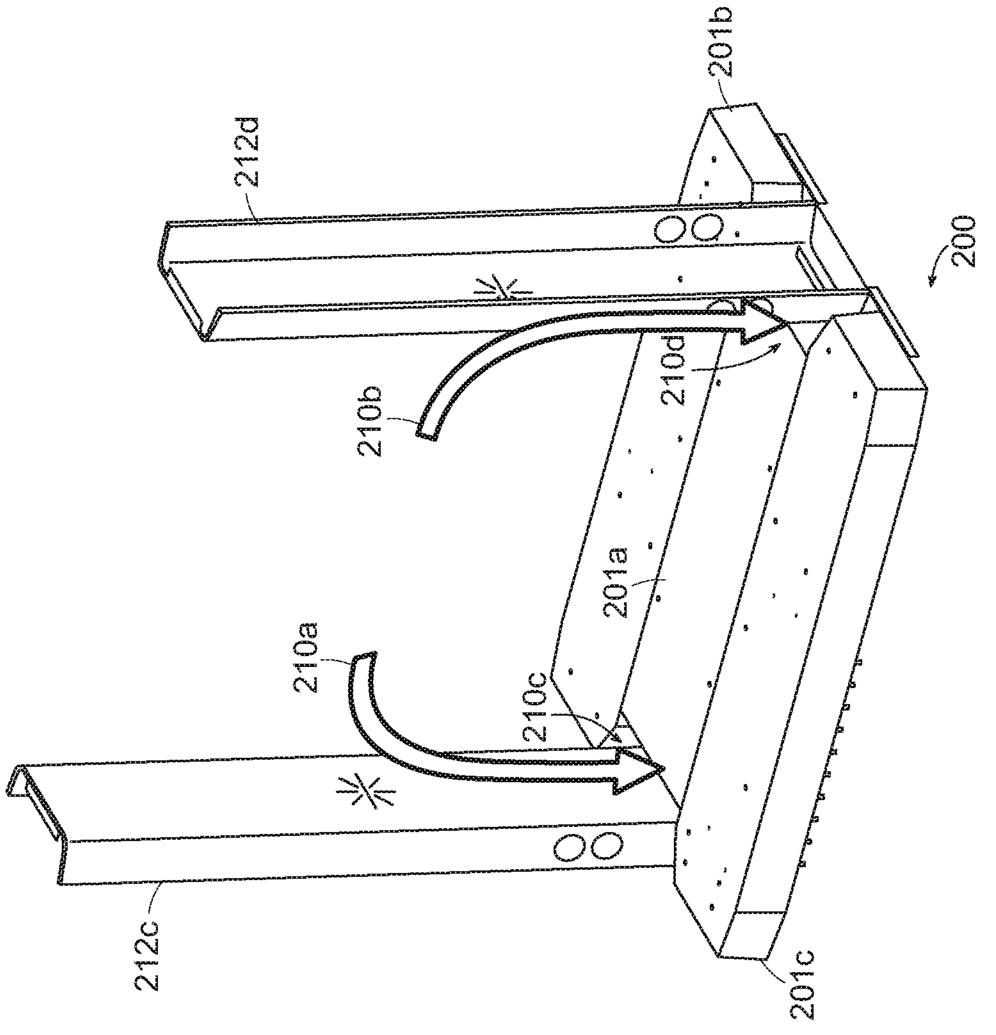
FIG. 2B is a top perspective view of the outer display surface convective cooling system and a subset of the components of the product dispenser illustrated in FIG. 2A.

In some embodiments, an outwardly-facing surface of a product dispenser display cover may be cooled via the flow of air across the surface. FIGS. 2A-2G illustrate an exemplary cooling system 200 for reducing the temperature an outwardly-facing surface 202 of a display 204 of a product dispenser 206. As shown in FIG. 2B, the cooling system 200 is integrated into the top of a housing 208 of the product dispenser 206, above the product dispenser display 204, and between opposing towers 212*a*, 212*b* of the product dispenser housing 208.

Figure 2C:
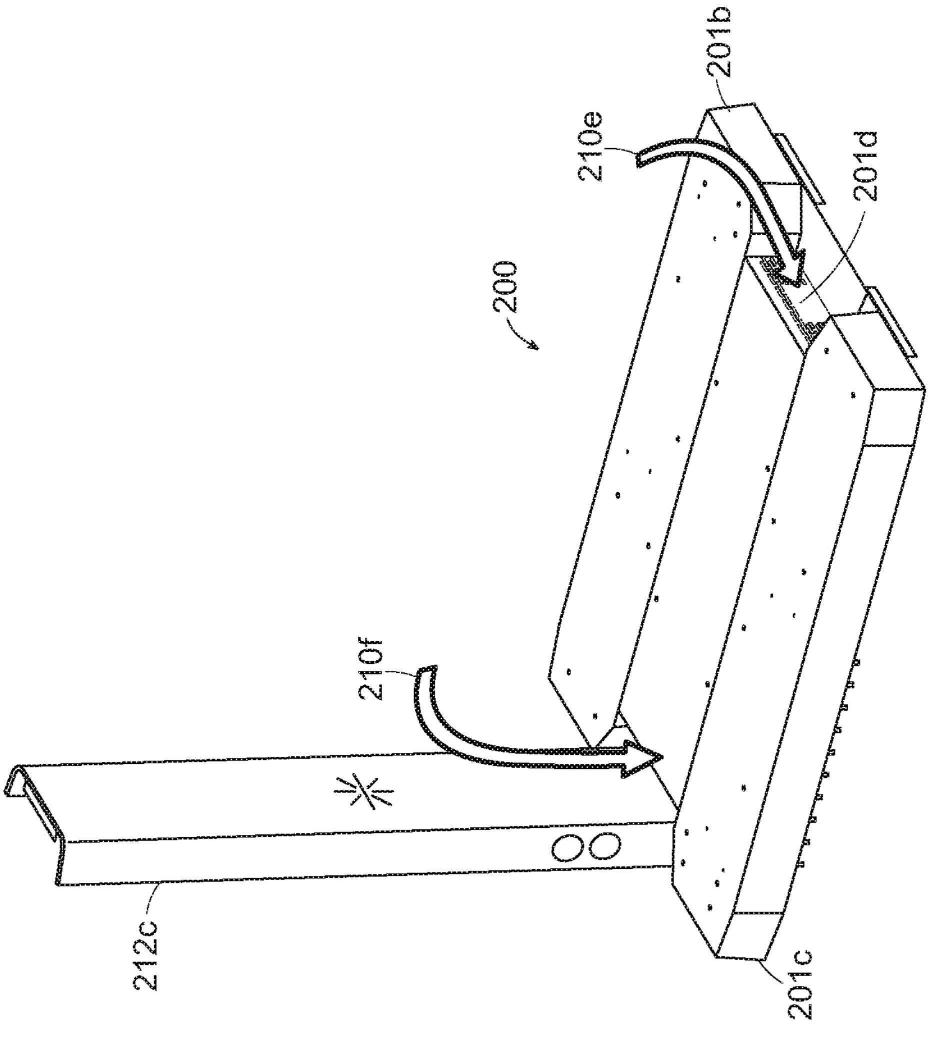
FIG. 2C is a top perspective view of a subset of the components of the outer display surface convective cooling system and a subset of the components of the product dispenser illustrated in FIG. 2A.

FIG. 2B is a perspective view of the cooling system 200 and front panels 212*c*, 212*d* of the opposing towers 212*a*, 212*b* of the product dispenser housing 208 illustrating the flow of air into and out of the cooling system 200. As shown, the cooling system 200 includes an intake cover 201*a* that is disposed between two fan housings 201*b*, 201*c* that are positioned on opposed sides of the cooling system 200 and that are configured to house a fan for purposes of forcing air through the cooling system as described in further detail below. Air can be drawn in the direction indicated by arrows 210*a* and 210*b* and into air inlets 210*c*, 210*d* that are defined by the outer lateral sides of the intake cover 201*a* and the front panels 212*c*, 212*d*. As shown in FIG. 2C, which shows the cooling system 200 and the front panel 212*c* (and with the front panel 212*d* hidden for clarity), the outer lateral side 201*d* features a pathway that permits the flow of air along the direction of arrow 210*e* into the region under the intake cover 201*a*. While not shown in FIG. 2C, the opposite lateral side of the intake cover 201*a* features a corresponding pathway that permits the flow of air along the direction of arrow 210*f* into the region under the intake cover 201*a*.

Figure 2D:
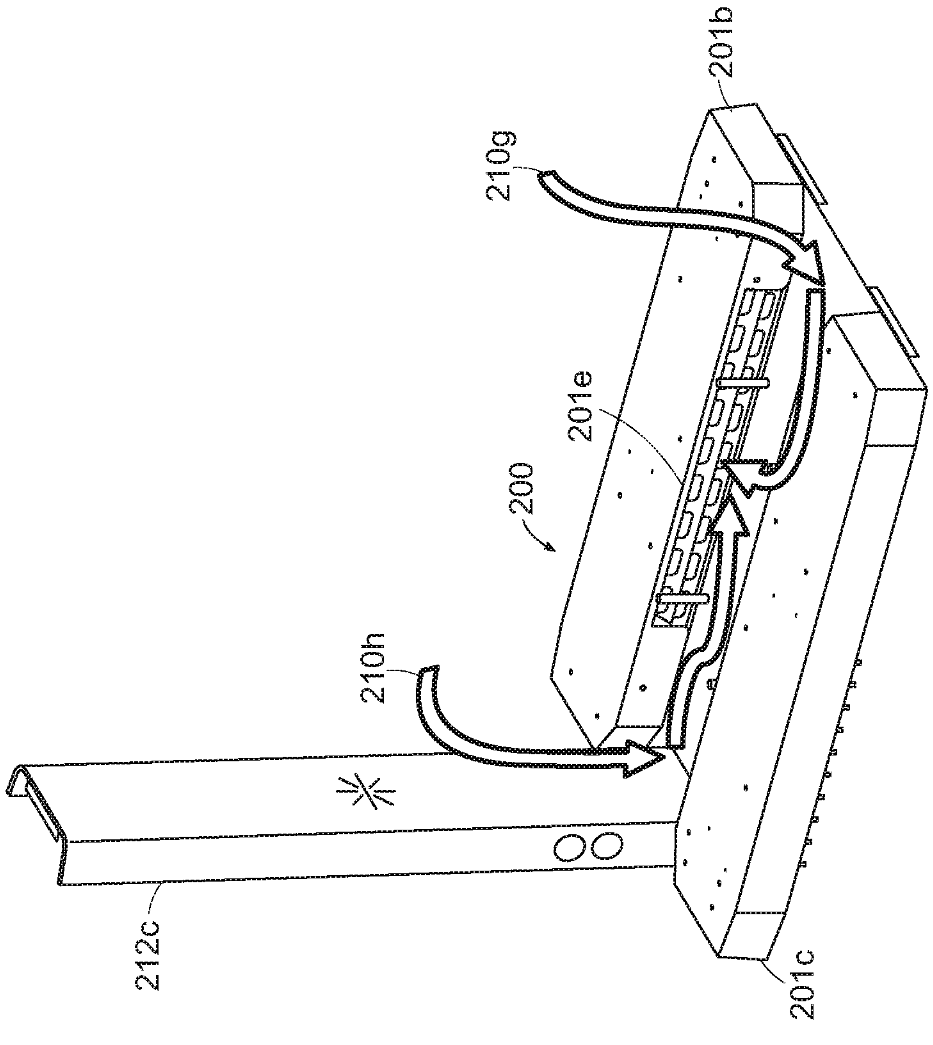
FIG. 2D is an additional top perspective view of a subset of the components of the outer display surface convective cooling system and a subset of the components of the product dispenser illustrated in FIG. 2A.

FIG. 2D shows the cooling system 200, with the intake cover 201*a* removed for clarity, and the flow of air into the fan housings 201*b*, 201*c*. As shown by the series of arrows 210*g*, 210*h*, once air enters the region of the system 200 located underneath the intake cover 201*a*, the air flows into air intakes formed on the inward-facing surface of each of fan housing 201*b* and 201*c*. As shown in FIG. 2D, fan housing 201*b* features an air intake 201*e* that faces the region underneath the intake cover 201*a* and that is configured to permit the flow of air into the fan housing 201*b* from that region. While not shown in FIG. 2D, fan housing 201*c* also features a corresponding air intake that faces the region underneath the intake cover 201*a* and is configured to permit the flow of air into the fan housing 201*c* from that region.

Figure 2E:
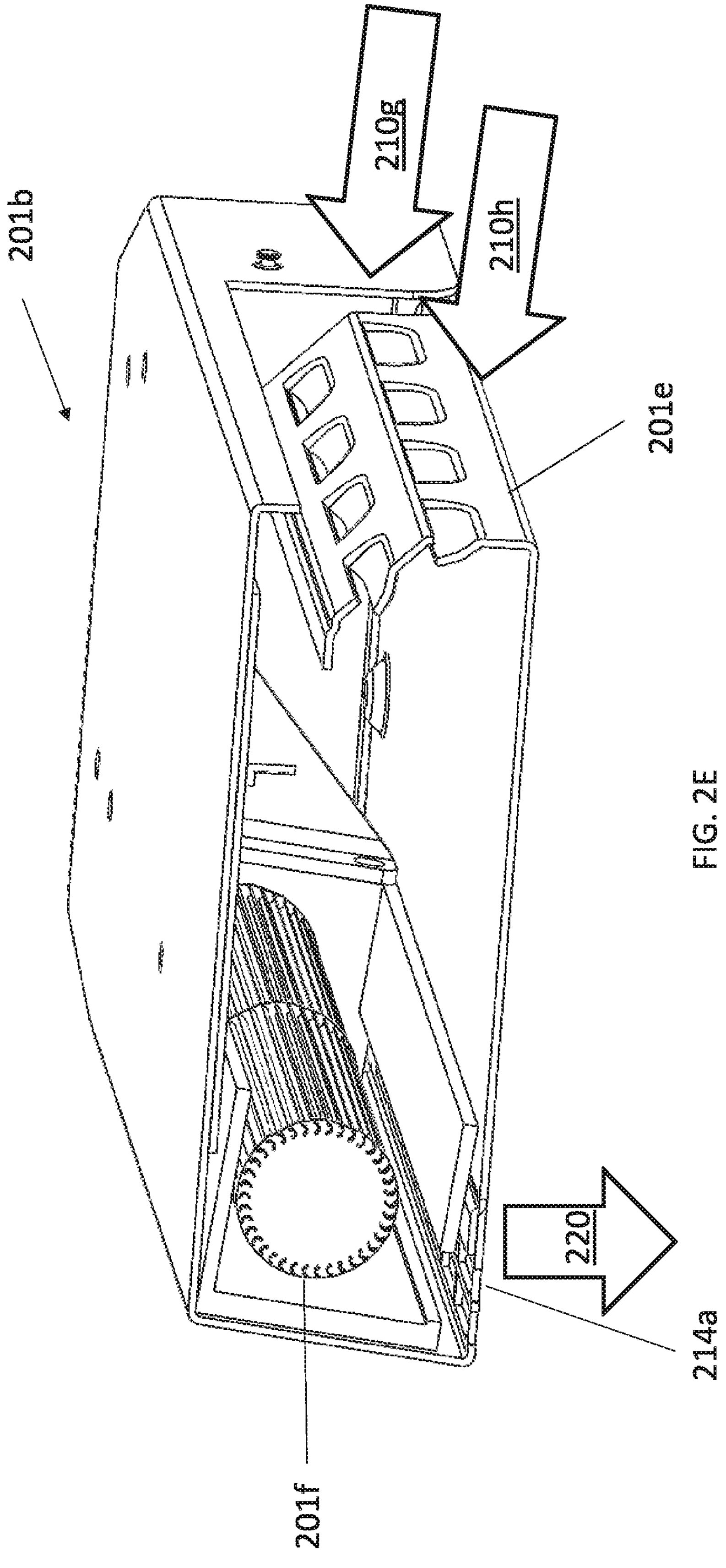
FIG. 2E is a section view of a fan housing of the outer display surface convective cooling system of FIG. 2A.

FIG. 2E illustrates a perspective section view of a fan housing of the cooling system 200, such as fan housing 201*b* or fan housing 201*c*. For purposes of illustration and explanation, FIG. 2E is discussed with respect to fan housing 201*b*. However, this description can be equally applicable to fan housing 201*c* as fan housing 201*c* may feature a configuration that is the same or substantially similar (e.g., mirrored, etc.) as that of fan housing 201*b*. As shown in FIG. 2E, the fan housing 201*b* houses a fan 201*f* that is configured to draw air into the air intake 201*e* of the fan housing 201*b* in the direction of arrows 210*g* and 210*h*. As shown, the fan 201*f* can be a bladed cylindrical fan that is configured to rotate about a longitudinal axis and thereby draw the air into the air intake 201*e*. However, other types of fan configurations may also be used in accordance with the configuration of the fan housing. The fan 201*f* is also positioned next to an air outlet 214*a* and is configured such that the rotation of the fan 201*f* causes the air drawn into the air intake 201*e* to be forced out of the air outlet 214*a* as explained in further detail below.

Figure 2F:
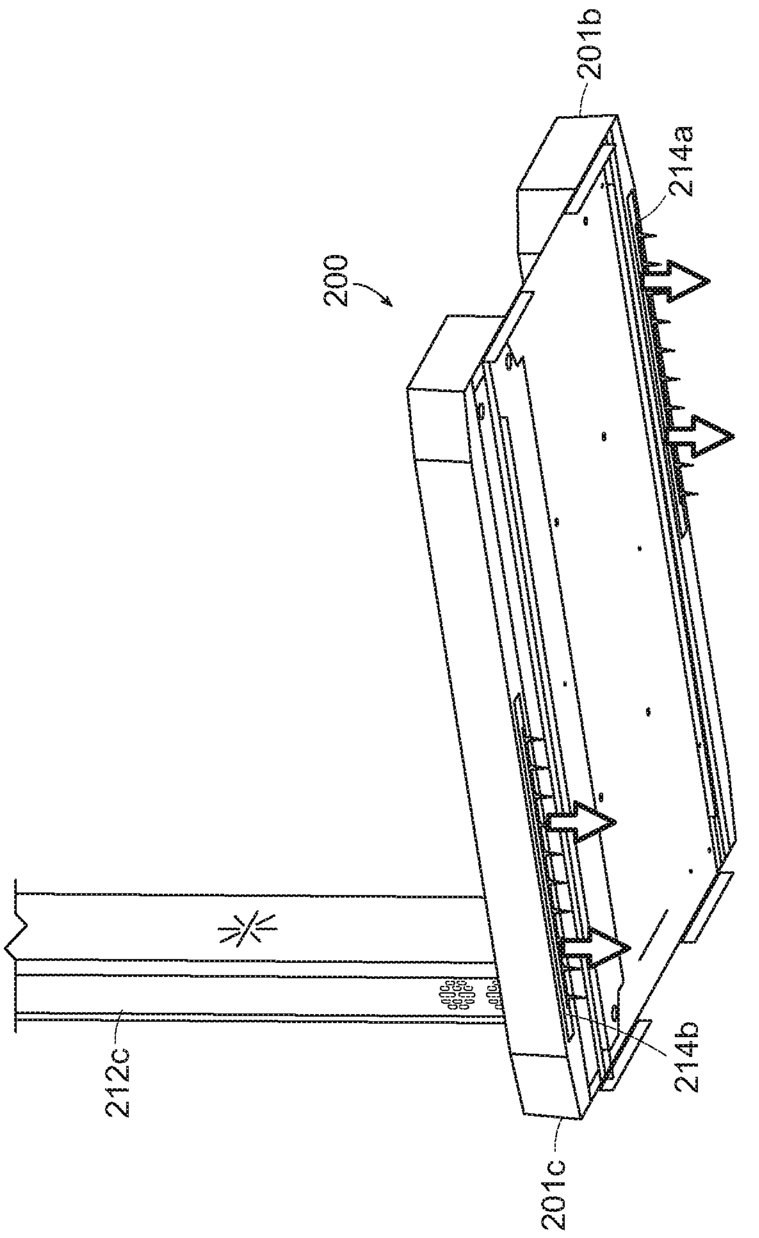
FIG. 2F is a bottom perspective view of a subset of the components of the outer display surface convective cooling system and a subset of the components of the product dispenser illustrated in FIG. 2A.
Figure 2G:
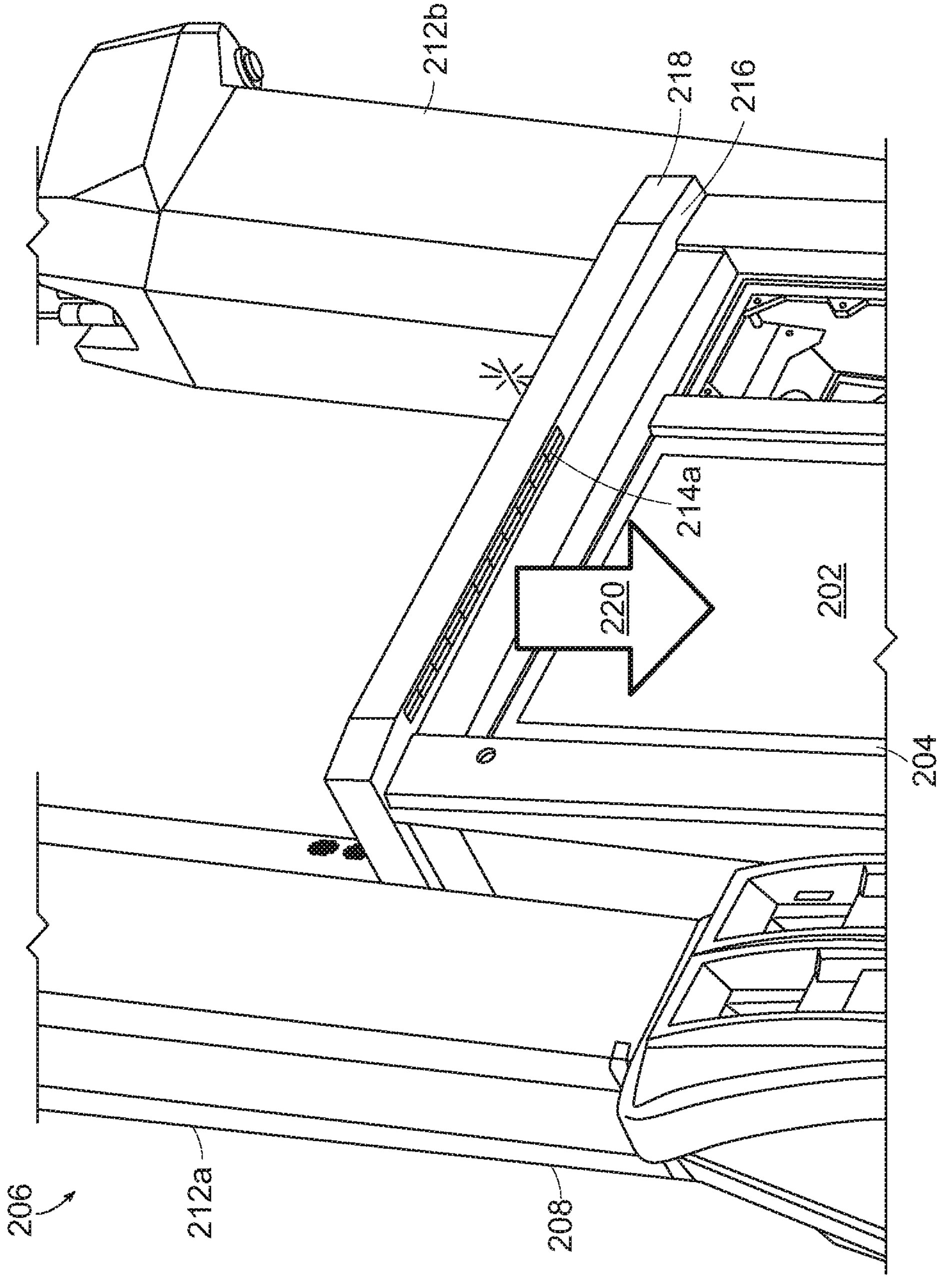
FIG. 2G is a perspective view of the product dispenser of FIG. 2A.

FIG. 2F illustrates the underside of the cooling system 200, and FIG. 2G illustrates the underside of the edge of the cooling system 200 when integrated into the top of the housing 208 of the product dispenser 206. As shown, this portion of the system 200 features air outlets 214*a* (see FIG. 2E) and 214*b* that are formed on an underside of the fan housings 201*b*, 201*c* respectively. The air outlets 214*a*, 214*b* are configured to direct the flow of the air forced out of the fan housings 201*b*, 201*c* by the fans located within the fan housings (such as fan 201*f* of FIG. 2E) and across the outwardly-facing surface of the product dispenser display, as shown in the direction of arrow 220. As a result, the system can blow cooling air onto the outwardly-facing surface 202 and thereby cause convective heat transfer from the outwardly-facing surface 202 of the display 204 and to the air flowing past the surface 202. This results in a reduction of the temperature of the outwardly-facing surface 202. Similar to the cooling benefits described above with respect to the vented display 100, by reducing the temperature of the product dispenser display 204, the cooling system can reduce the likelihood of an overheating failure of one or more components of the display assembly. In addition, when the product dispenser display is configured as a touchscreen, the dissipation of heat in the product dispenser display 204 caused by the air flowing across the outwardly-facing surface 202 of the display 204 can reduce the likelihood of a product dispenser user burning themselves when touching the outwardly-facing surface during an interaction with the product dispenser.

In some embodiments, the operation of one or more of the fans located within the fan housings 201*b*, 201*c* of the system 200 may be controlled based on data received or generated by one or more devices in operable communication with the forced convection device 128, such as temperature sensors, solar loading sensors, a timer, an infrared temperature sensor, a camera, and the like. As such, one or more of the fans may be activated in response to one of these devices sensing or determining a condition in which a temperature of the surface 202 has or is likely to have exceeded a temperature threshold. For example, in some embodiments, one or more of the fans may be activated in response to a temperature sensor measuring the temperature of the surface 202 and determining that the measured temperature has exceeded a temperature threshold and therefore the surface 202 may be unsafe to touch.

Figure 3A:
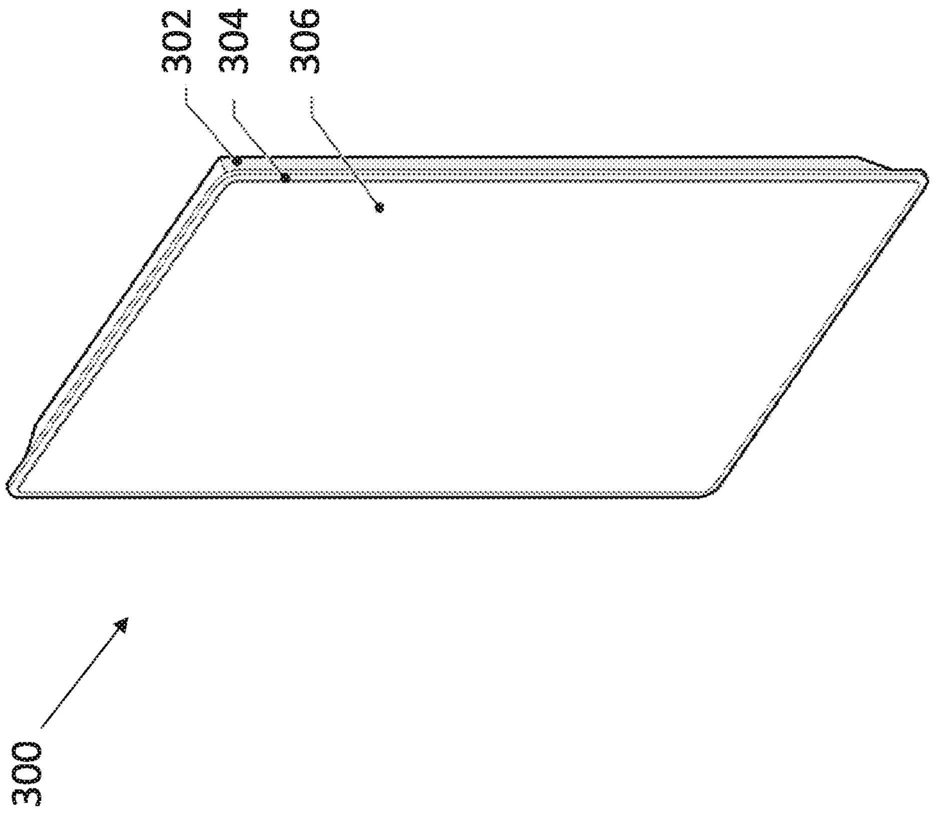
FIG. 3A is a perspective view of a touchscreen display featuring an insulating cover film.
Figure 3B:
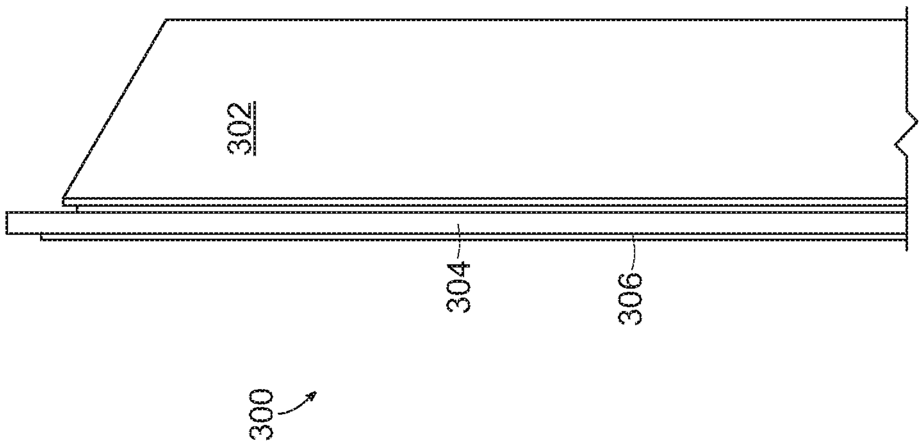
FIG. 3B is a side view of the touchscreen display of FIG. 3A.
Figure 3C:
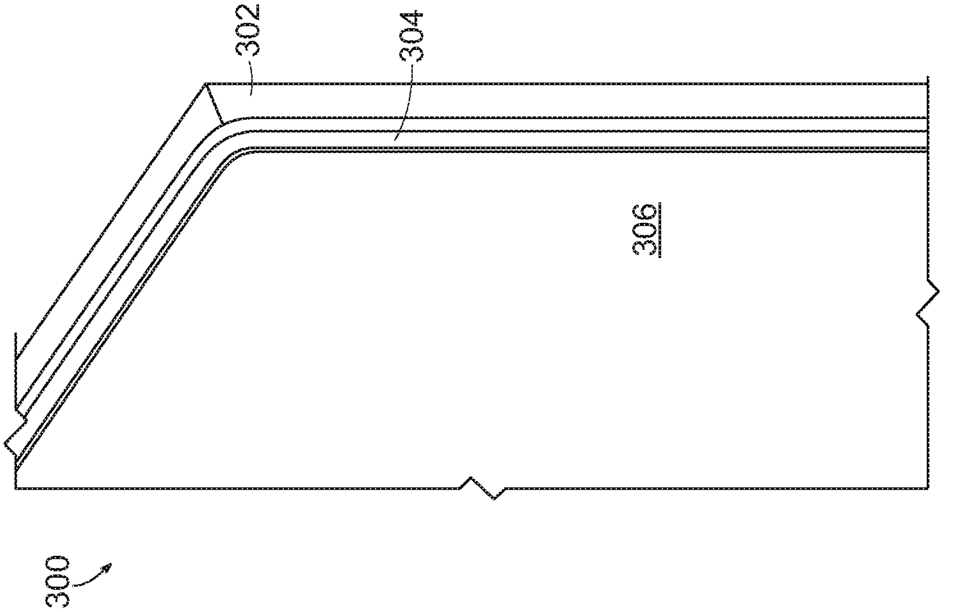
FIG. 3C is a detailed perspective view of the touchscreen display of FIG. 3A.

In some embodiments, to reduce the likelihood of a product dispenser user burning their finger when touching an outwardly-facing surface of a product dispenser display, the outwardly-facing surface can include a thermally-insulating material that minimizes the transfer of heat between the outwardly-facing surface and the product dispenser user's finger. FIGS. 3A-3C illustrate an exemplary embodiment of a product dispenser touchscreen display 300 that incorporates an insulating cover film to reduce the transfer of heat from the product dispenser display to the product dispenser user's finger. As shown, the product dispenser touchscreen display 300 includes a display module 302 that is configured to generate and project images for presentation to the product dispenser user. The product dispenser touchscreen display module 302 can include one or more components of the vented display 100 described above and illustrated in FIGS. 1A-1D, such as the touch sensor layer 106, the LCD 108, the infrared film 110, and/or the backlight assembly 114. As illustrated in FIGS. 3A-3C, the product dispenser touchscreen display 300 also includes a transparent cover 304 that is substantially the same as the transparent cover 104 described above and that is disposed on an outwardly-facing surface of the display module 302. Additionally, the product dispenser touchscreen display includes an insulating cover film 306 disposed on the outwardly-facing surface of the transparent cover 304. In some embodiments, the insulating cover film 306 can comprise a single layer of thermally-insulating material. And, in some embodiments, the insulating cover film 306 can comprise a plurality of layers of thermally-insulating material, such as a multi-layer polyester sheet with an acrylic adhesive.

The insulating cover film 306 comprises the outer-most surface of the product dispenser touchscreen display and is the portion of the display 300 that the product dispenser user contacts when interacting with the display 300. As referenced above, the insulating cover film 306 features a relatively low thermal conductivity and as such can minimize the transfer of heat from the display 300 to the product dispenser user's finger, thereby reducing the likelihood of the product dispenser user burning their finger when contacting the display 300. As such, the product dispenser user can safely interact with a hot-to-the-touch display 300 for a longer duration of time than would otherwise be possible without the incorporation of the insulating cover film 306 into the display 300.

Although the devices and systems described above are described in the context of the operation of a product dispenser, one skilled in the art will appreciate that the devices and systems could be incorporated into a variety of components that are installed in outdoor settings and exposed to high-temperature environments, such as automated teller machines (ATMs), electrical charging kiosks, vending machines, payment kiosks, and the like.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety. Those skilled in the art will understand that the systems, devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

What is claimed is:

1. A product dispenser, comprising:

a housing having one or more components installed therein and configured to dispense fuel;

a display assembly incorporated into the housing and comprising a display; and a cooling system incorporated into the housing above the display assembly, the cooling system including a fan housing having at least one air inlet extending across a first exterior surface of the fan housing and configured to receive air from an ambient environment located externally to the housing, a fan having a rotational axis extending within the fan housing and in fluid communication with the air inlet, and an air outlet extending across second exterior surface of the fan housing and in fluid communication with the fan, the air outlet disposed above an exterior-facing surface of the display, wherein the fan is configured to draw the air from the ambient environment through the air inlet and to direct the air out of the air outlet such that the air flows down and across the exterior-facing surface of the display.

2. The product dispenser of claim 1, wherein operation of the fan is controlled based on data received from at least one of a temperature sensor, a timer, an infrared temperature sensor, or a camera.

3. The product dispenser of claim 1, wherein the air inlet and the air outlet are fluidically connected to an inner cavity within the housing, and the fan is configured to circulate the air within the inner cavity.

4. The product dispenser of claim 1, wherein the housing further comprises a pair of opposing towers, the cooling system integrated into an upper portion of the housing at a location above the display and in between the pair of opposing towers of the housing.

5. The product dispenser of claim 4, wherein the cooling system includes an intake cover adjacent to the fan housing and the air inlet is positioned at a lateral side of the intake cover.

6. The product dispenser of claim 5, wherein the first exterior surface of the fan housing and the second exterior surface of the fan housing are perpendicular to one another.

7. The product dispenser of claim 6, wherein the air intake includes overlapping rows of apertures extending along the first exterior surface of the fan housing.

8. The product dispenser of claim 7, wherein the fan is disposed opposite the overlapping rows of apertures.

9. The product dispenser of claim 1, wherein the fan is a cylindrical shaped fan having a longitudinal axis extending along a length of the fan and a plurality of fan blades arranged radially about the longitudinal axis.

10. The product dispenser of claim 1, wherein the cooling system further comprises a forced convection device configured to cool the air received from the ambient environment, the forced convection device including at least one of a vortex cooler, a heat exchanger, a water cooler, a peltier cooler, or refrigeration system.

11. The product dispenser of claim 1, wherein the display assembly comprises a transparent cover coupled to the display, the transparent cover having a first surface and a second surface opposite the first surface, the display positioned adjacent to the first surface of the transparent cover.

12. The product dispenser of claim 11, wherein the display assembly comprises an infrared film layer bonded to the display opposite the transparent cover.

13. The product dispenser of claim 11, wherein the display assembly comprises a touch sense layer coupled to the transparent cover.

14. The product dispenser of claim 1, wherein the display assembly comprises a backlight source configured to generate light for illuminating the display and a backlight cover layer configured to diffuse the light emitted by the backlight source.

15. The product dispenser of claim 14, wherein the display assembly comprises an air gap separating the display from the backlight source, the air gap configured to permit a flow of air therethrough and thereby facilitate the transfer of heat from the display assembly to the air.

16. The product dispenser of claim 11, wherein the display assembly comprises a thermally-insulating film layer formed on the second surface of the transparent cover.

17. The product dispenser of claim 16, wherein the thermally-insulating film layer includes a single layer of thermally-insulating material or a plurality of layers of thermally-insulating material.

18. The product dispenser of claim 17, wherein the plurality of layers include a multi-layer polyester sheet with an acrylic adhesive.

19. The product dispenser of claim 1, wherein the product dispenser is one of a fuel dispenser, an automated teller machine, an electrical charging kiosk, a vending machine, or a payment kiosk.

* * * * *